United States Patent [19]

Hård af Segerstad

[11] 4,222,279
[45] Sep. 16, 1980

[54] TRANSMISSION MECHANISM

[76] Inventor: Carl G. Hård af Segerstad, Karasgården, S-795 00 Rätvik, Sweden

[21] Appl. No.: 854,324

[22] Filed: Nov. 23, 1977

[30] Foreign Application Priority Data

Nov. 30, 1976 [SE] Sweden .............................. 7613392

[51] Int. Cl.$^2$ ............................................. F16H 21/44
[52] U.S. Cl. ................................................... 74/100 R
[58] Field of Search ............................... 74/100 R, 47

[56] References Cited

U.S. PATENT DOCUMENTS

| 1,997,209 | 4/1935 | Douglas | 74/100 |
| 2,576,771 | 11/1951 | Bentley | 74/100 |
| 3,955,431 | 5/1976 | Davis | 74/100 |

Primary Examiner—Samuel Scott
Assistant Examiner—Wesley S. Ratliff, Jr.
Attorney, Agent, or Firm—Charles E. Brown

[57] ABSTRACT

The invention relates to a transmission mechanism for imparting rotational movements to a driven member by means of a reciprocating drive member. The mechanism comprises means pivotally connected to the drive member for alternately actuating two dogs of an operating unit associated with the driven member so as to move the operating unit to one or the other of two end positions, thereby providing said rotational movement of the driven member. The means for actuating the operating unit is an arm capable of pivoting to and fro across a central plane through the travel path of the drive member, said arm being arranged to effectuate the alternate actuation of both the dogs by one and the same free end thereof, power means for moving the operative unit to the respective end positions being pivotally mounted in relation to a stationary pivot and having a point of action being opposed to said pivot. This point of action of the power means follows the operating unit when moving this between said end positions.

5 Claims, 5 Drawing Figures

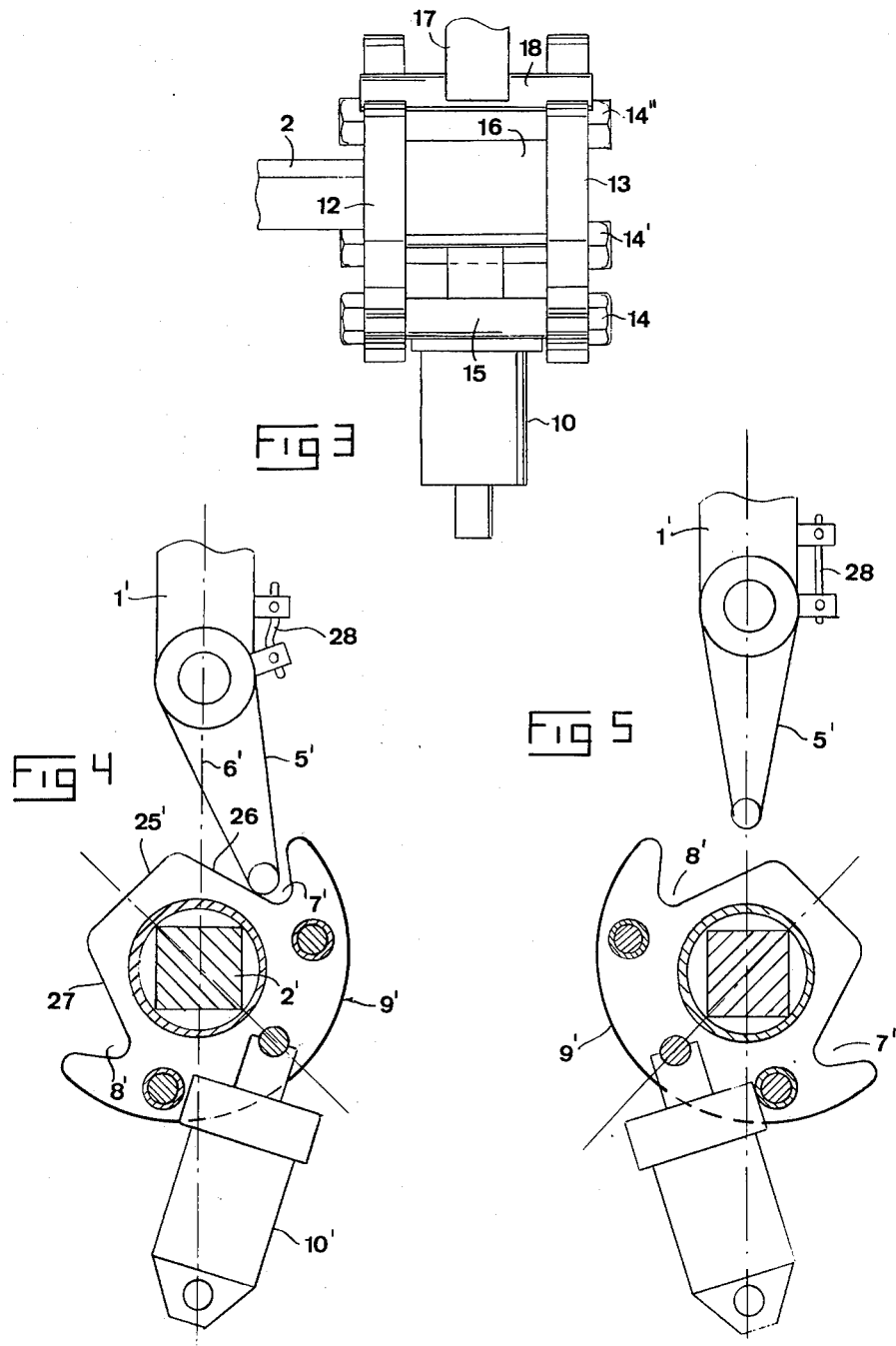

4,222,279

TRANSMISSION MECHANISM

BACKGROUND OF THE INVENTION

This invention relates to a transmission mechanism for imparting rotational movements to a driven member by means of a reciprocating drive member. Such rotational movements may be continuous, but preferably they are of a reciprocating type suitable for controlling valves, the driven member then being a shaft for rotating the valve.

By the U.S. Pat. No. 1,929,268 such a transmission mechanism is previously known comprising means pivotally connected to the drive member for alternately actuating two dogs of an operating unit associated with the driven member—the dogs being located on either side of a central plane through the travel path of the drive member—so as to move the operating unit to one or the other of two end positions, thereby providing the rotational movement of the driven member.

This mechanism might be sufficient for controlling valves of the type presented in said patent specification, i.e. valves being rotated an angle merely amounting to about 20° to 30°. When controlling other types of valves, such as ball valves, throttle valves or the like, it is, however, necessary to rotate a shaft at least 90° to and fro between the end positions thereof. In connection with the latter valves, the transmission mechanism according to U.S. Pat. No. 1,929,268 is quite impossible to use. Furthermore, the mechanism in question is rather complicated and unreliable.

SUMMARY OF THE INVENTION

It is an object of the present invention to provide a transmission mechanism which eliminates the above-mentioned shortcomings and which by single means makes it possible to rotate e.g. a valve-controlling shaft or an analogous driven member 90° or more in a reciprocating movement.

Another object of the invention is to render such a mechanism reliable in operation while using inexpensive means for the production thereof.

The above mentioned objects are achieved by a mechanism including the improvement that the means for actuating the operating unit is an arm capable of pivoting to and fro across said central plane and arranged to effectuate the alternate actuation of both the dogs by one and the same free end of the arm and that power means for moving the operating unit to the respective end positions is pivotally mounted in relation to a stationary pivot and has a point of action being opposed to said pivot, said point of action following said operating unit when moving this between said end positions.

BRIEF DESCRIPTION OF THE DRAWINGS

FIG. 3 is a detail view taken along line III—III in FIG. 1; and

FIGS. 4 and 5 are fragmentary sectional views illustrating an alternative embodiment of the transmission mechanism during two different working moments.

DESCRIPTION OF THE PREFERRED EMBODIMENTS

Figure 1:
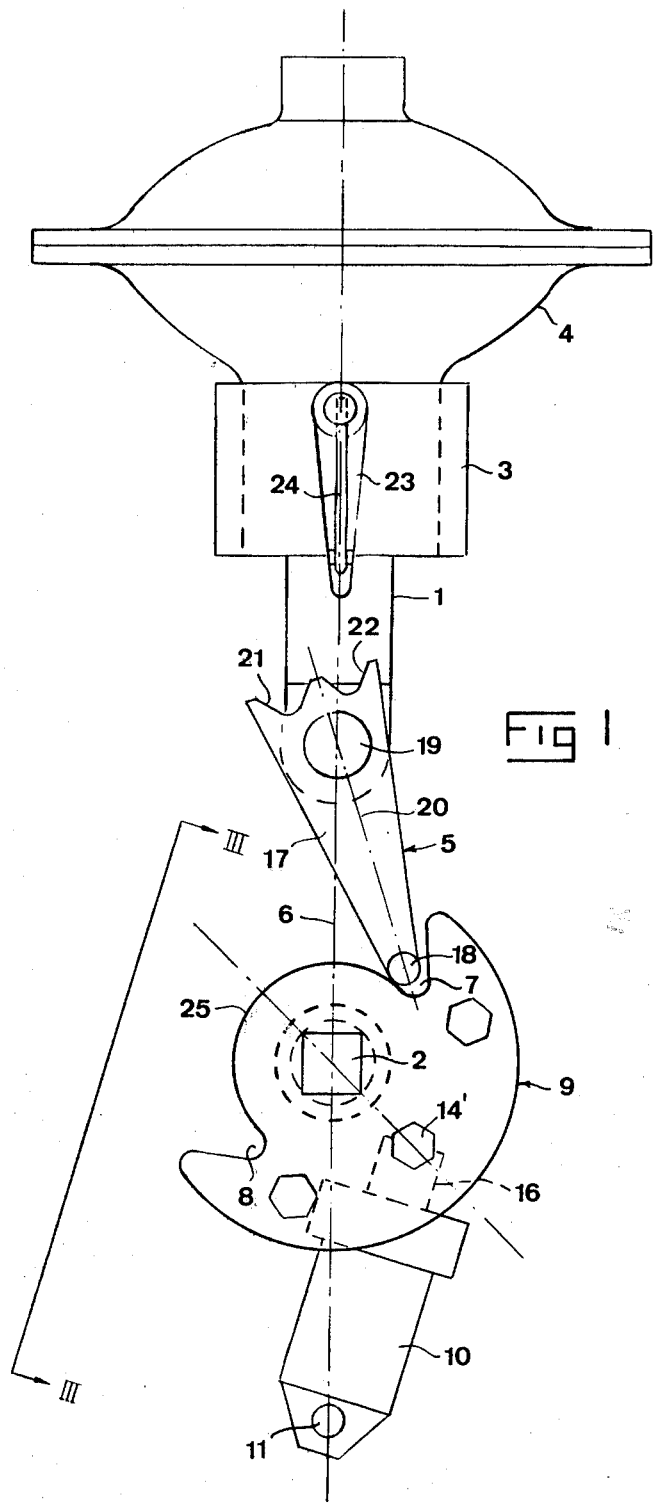
FIG. 1 is a side view of a first embodiment of the transmission mechanism of the invention illustrated in a first working moment.
Figure 2:
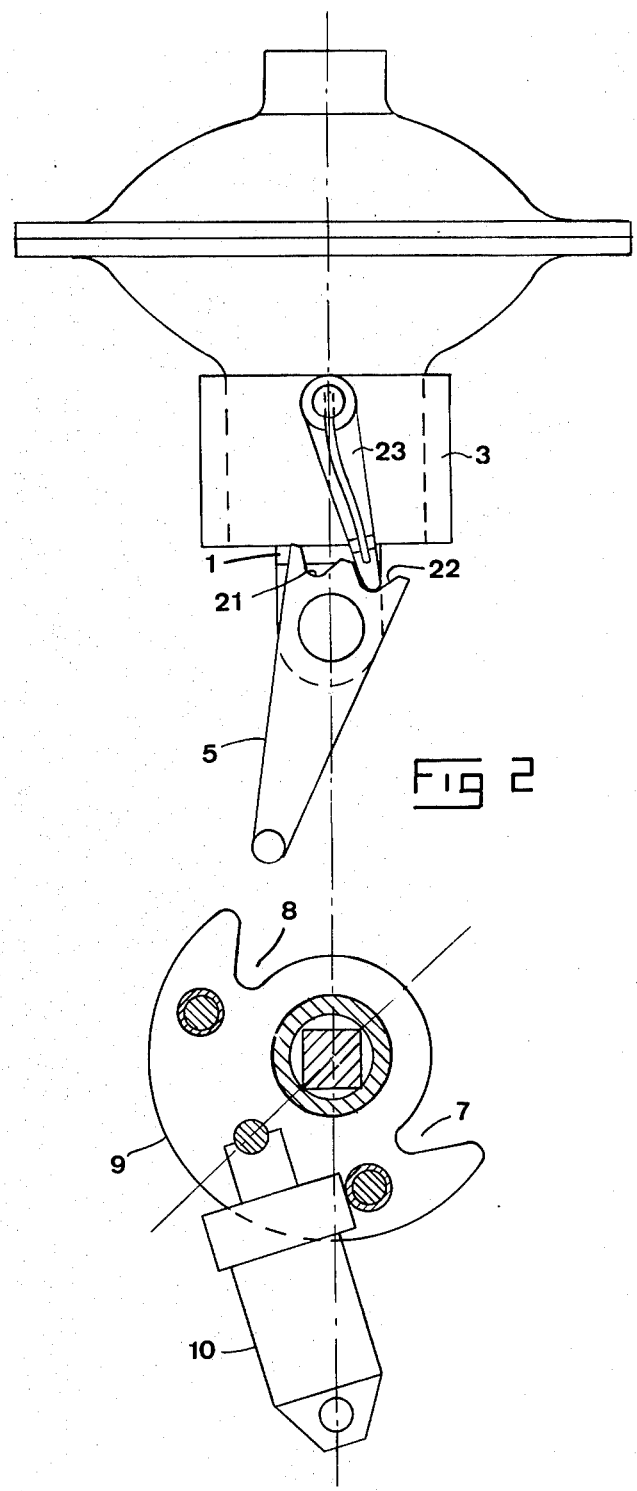
FIG. 2 is a similar partially cut side view illustrating the mechanism in a second working moment.

The transmission mechanism illustrated in FIGS. 1 to 3 comprises a reciprocating drive member 1 and a member 2 being driven thereby. In this case, said second member 2 is to be rotated to and fro about its own axis. In the embodiment illustrated, said drive member 1 consists of a piston rod reciprocating in relation to a stationary part designated 3 by means of a source of power 4, in this case in the form of a membrane means. The source of power 4 may per se be constituted by any arbitrary means being suitable for this purpose, for instance piston-cylinder means, magnet means or the like. The essential thing is that the drive member 1 in one way or another is reciprocated. The driven member 2 may be a shaft or spindle for controlling one or more valves. More specifically, said valve spindle is intended to be used for readjusting a valve 90°.

According to the invention, an arm generally designated 5 is connected to the drive member 1, said arm being pivotable across a central plane 6 extending through the travel path of said drive member 1. This pivotable arm 5 is arranged to alternately actuate two dogs or seats 7 and 8 of an operating unit generally designated 9. This unit 9 is associated with the driven member 2, said seats or dogs being located on either side of said central plane 6. In the embodiment shown, a power means 10 is connected to the operating unit 9, said power means being pivotably mounted on a pivot 11 stationary arranged in any arbitrary manner.

As appears from FIG. 3, the operating unit 9 comprises two spaced apart interconnected plates 12, 13 having circumferential portions in which the seats or dogs 7, 8 are recessed. Said plates 12, 13 may be interconnected in any suitable manner, although it is shown in the drawings how they are kept together by means of three bolts 14 secured by nuts, said bolts projecting through apertures in the plates and through tube pieces 15 which are disposed between the plates in order to serve as spacers therefor. Further, there is provided a larger spacing tube piece 16 enclosing the valve spindle 2. In this case said valve spindle 2 has a square cross section, the spindle fitting in analogously square-shaped holes in the plates 12, 13. Hence it follows that the valve spindle in this case is non-rotatably connected to the operating unit 9. This is, however, no indispensable condition for carrying out the invention, since the operating unit and the spindle or the driven member 2 can be interconnected by gear or transmission means capable of changing the gear ratio between the operating unit 9 and the driven member 2 or alternatively provide a feeding or movement of the driven member 2 in one direction of rotation, but not in the opposite one.

It should be noted that the spacing between the plates 12 and 13 is great enough to contain said power means 10 between said plates as illustrated in FIG. 3.

In this case, said power means 10 consists of a so called washer spring casing comprising a casing, a spring and a piston rod-like pin 16 projecting out from the casing, said pin acting with a certain spring force upon the operating unit 9, more specifically upon the central bolt 14' interconnecting the plates.

The pivotable arm comprises on one hand a stem 17 associated with the drive member 1, the dimensions of said stem being such that the stem is contained between the two plates 12, 13, and on the other two projections 18 projecting in opposite directions from the stem 17, said projections being intended to engage the dogs 7, 8. Said projections 18 may advantageously be made of one single transverse dowel fixed to the end of the stem. The pivotable arm 5 is connected to the drive member 1 by a pivot 19, the center of which is located in the above-mentioned central plane 6. For instance by means of a friction connection or possibly a rocker spring disposed between the arm and the drive member, the pivotable arm 5 is arranged to be retained in a given, unvariable position in relation to the drive member when the arm is in an unaffected condition. On either side of a center line 20 through the arm there are two suitably curved recesses 21 and 22 in the end of the arm. These two recesses are arranged to alternately co-operate with a finger 23 pivotably mounted on the stationary part 3, said finger, by the action of a spring 24, for instance a needle spring or a wire spring, always urging to assume a rest position in which the finger is located in the central plane 6 as illustrated in FIG. 1.

The transmission mechanism described operates in the following manner. In FIG. 1 is shown how the operating unit 9 (and hence the valve spindle 2 and the valves belonging thereto) is put in a first end position. When the operating unit is to be reversed from this first position to a second position shown in FIG. 2, the drive member 1 is pushed out from the stationary part 3, the arm 5, which is set in the correct position of pivoting, moving into engagement with the dog 7. A continued pushing of the drive member 1 now means that the operating unit 9 is rotated in clockwise direction, the drive member overcoming the spring force of the power means 10 through the pivotable arm 5. When the point of action of said power means upon the operating unit 9, i.e. the bolt 14', has passed the central plane 6, the power means alone is capable of attending to the rotation of the operating unit to the position shown in FIG. 2. In practice, bolt 14' passes the central plane 6 after about 45° of rotation of the operating unit, while the pivotable arm is caused to follow the operating unit during about 60° of rotation thereof. Then the pivotable arm is returned to an initial position by returning the drive member. During this return movement the finger 23 will engage the recess 22. This means that the pivotable arm on continued return movement of the drive member is forced to pivot about the pivot 19, thereby moving to the position shown in FIG. 2. Now the pivotable arm is ready to engage the dog 8 so as to attend to a reversal of the operating unit 9 from the position of FIG. 2 back to the position of FIG. 1.

Of course the above-mentioned reversing operations may be carried out either at a high speed or at a low speed.

In the embodiment shown in FIGS. 1 to 3, there is between the two dogs 7, 8 a cam or guide surface 25 having in this particular embodiment a partially circular profile shape.

In FIGS. 4 and 5 an alternative embodiment of the invention is illustrated. In this case, the cam surface 25' between the dogs 7' and 8' of the operating unit 9' is shaped substantially as an U having diverging shanks. More specifically said cam surface 25' presents two portions 26 and 27 extending continously at an inclined angle from a dog, for instance dog 7' in FIG. 4, and past the central plane 6' when the operating unit has assumed an end position, the pivotable arm being arranged to abut against said surface portion and thereby be guided to engagement with the dog at the beginning of a reversing movement. In this embodiment, the pivotable arm 5' is by spring action arranged to assume a rest position in which the arm is located in the central plane 6', as shown in FIG. 5, after effectuating a reversal of the operating unit. To this end, a spring 28, such as a needle spring or a wire spring, is connected to the drive member 1', said spring always urging to move the pivotable arm to the position shown in FIG. 5. By the fact that one of the above-mentioned cam surface portions 26, 27 extends from its dog and past the central plane 6' as soon as the operating unit 9' assumes an end position, it is guaranteed that the pivotable arm 5' always will be guided towards the correct dog when performing the reversing operation in question.

In other respects the transmission mechanism illustrated in FIGS. 4 and 5 operates in the same manner as the mechanism described in connection with FIGS. 1 to 3.

Of course, the invention is not limited exclusively to the embodiments described above and illustrated in the drawings. Thus, it is for instance possible to impart to the operating unit an angular rotation being greater than the 90° shown in the drawings. It is also conceivable to replace the spring device 10 by other types of power means, for instance a hydraulic or pneumatic jack, the operating unit being retained in the respective end positions by means of click spring means or the like. As stop means for the operating unit at the two end positions thereof, one can either utilize the valves being associated to the driven members or special stop members arranged to act against e.g. the two bolts 14 and 14" being remote from each other. In the drawings, pin 16 of the spring device 10 is connected to the bolt 14' simply by a female recess in the end portion of the pin. Instead of such a connection, it is of course possible to use ordinary bearing means for effectuating the connection. It should be understood that the expression "driven member" is meant to include also other arbitrary driven elements than just a spindle for valve control. Thus, e.g. push rods, possibly pivotable or rotatable push rods or the like connected to the operating unit, may constitute the driven member. The driven member may also be constituted by the operating unit itself or by a portion being rigidly connected thereto or integral therewith. For certain applications it may also be suitable to connect the driven member excentrically to the operating unit in relation to the axis of rotation thereof. Furthermore, other types of spring devices than just compression springs are conceivable, such as one or more tension springs arranged in a suitable manner. Other modifications of the invention are also conceivable within the scope of the accompanying claims.

What I claim:

1. A transmission mechanism for imparting rotational movements to a driven member about a fixed axis by means of a reciprocating drive member, said mechanism comprising means pivotally connected to said drive member for alternately actuating two dogs of an operating unit associated with said driven member, said dogs being located on opposite sides of a central plane extending through the travel path of the drive member, so as to move said operating unit to one or the other of two end positions thereby providing said rotational movement of the driven member, the improvement that said means for actuating said operating unit is an arm mounted for pivoting to and fro across said central plane and arranged to effectuate said alternate actuation of both the dogs by one and the same free end thereof, and power means located on a side of said fixed axis remote from said drive member and opposing said drive member for moving said operating unit to the respective end positions, said power means being pivotally mounted in relation to a stationary pivot and having a point of action opposed to said pivot, said power means having said point of action following said operating unit when moving between said end positions, said operating unit comprising two spaced-apart interconnected plates having circumferential portions in which said dogs are formed, and said arm comprising a stem which is connected to said drive member and contained between said plates as well as two projections projecting in opposite directions from said stem for engaging said dogs.

2. A mechanism according to claim 1, wherein said pivotable arm has two recesses, one on either side of a center line through the arm, said recesses being arranged to alternately co-operate with a finger pivotably mounted on a stationary part, said finger, by spring action, always tending to assume a rest position in which it is substantially located in said central plane, said arm being in an unaffected condition retained in a certain unvaried position in relation to said drive member, said arm when returning towards said drive member after accomplishing a reversal of said operating unit being reversed from a first inclined position to a second inclined position in relation to said central plane by said finger being engaged in one of said recesses and during continued returning of said drive member forcing said arm to move from one of said inclined positions to the other.

3. A mechanism according to claim 1, wherein said pivotable arm is by spring action arranged to assume a rest position in which it is located in said central plane after accomplishing a reversal of said operating unit, a cam surface extending between said two dogs having two portions, one of which extends continuously at an inclined angle from one of said dogs and past said central plane when said operating unit is in an end position, said arm being arranged to abut against said cam surface portion when starting a reversing movement and thereby be guided by said surface portion into engagement with said dog.

4. A mechanism according to claim 1, wherein said power means comprises a compression spring unit, the point of action of which lies in a plane located substantially halfway between said dogs and wherein said pivot for said spring unit is located in said central plane.

5. a transmission mechanism for imparting rotational movements to a driven member about a fixed axis by means of a reciprocating drive member, said mechanism comprising means pivotally connected to said drive member for alternately actuating two dogs of an operating unit associated with said driven member, said dogs being located on opposite sides of a central plane extending through the travel path of the drive member, so as to move said operating unit to one or the other of two end positions thereby providing said rotational movement of the driven member, the improvement that said means for actuating said operating unit is an arm mounted for pivoting to and fro across said central plane and arranged to effectuate said alternate actuation of both the dogs by one and the same free end thereof, and power means disposed on an opposite side of said fixed axis remote from and relative to said drive member, said power means having a point of action, said power means being pivotally mounted on a fixed pivot disposed remote from said drive member and connected at said point of action to said operating unit midway between said dogs, said power means generally opposing said drive member and being resiliently collapsible for permitting said operating unit to rotate to an over center position from where said power means is operable to effect rotation of said operating unit beyond the movement effected by said drive member to the desired end position of said operating unit, said operating unit comprising two spaced-apart interconnected plates having circumferential portions in which said dogs are formed, and said arm having a free end in the form of a stem connected to said drive member and contained between said plates, said stem having perpendicular extensions on both sides for engaging said dogs.

* * * * *